Sept. 29, 1959     A. A. CHERNOSKY     2,906,995

VARIABLE GAP RELUCTANCE TRANSDUCER

Filed Nov. 14, 1956

*INVENTOR.*
Allen A. Chernosky,
BY John B. Davidson
ATTORNEY.

United States Patent Office 2,906,995
Patented Sept. 29, 1959

2,906,995

VARIABLE GAP RELUCTANCE TRANSDUCER

Allen A. Chernosky, Houston, Tex., assignor, by mesne assignments, to Jersey Production Research Company, Tulsa, Okla., a corporation of Delaware Application November 14, 1956, Serial No. 622,108

2 Claims. (Cl. 340—17)

This invention relates to geophysical prospecting and more particularly to variable-gap reluctance transducers for producing electrical signals responsive to waves of an elastic nature impinging thereon.

In the copending patent application of A. A. Chernosky for "Variable-Gap Reluctance Transducer," Serial No. 444,171, filed July 19, 1954, and assigned to the assignee of the present invention, there is described a transducer making use of a pair of magnetic elements separated by an air gap of the order of a few one-thousandths of an inch. A coil wound about at least one of the magnetic elements produces a voltage responsive to variations in the magnetic flux effected as a result of the air gap fluctuation brought about by impinging elastic waves. For the purpose of spacing the magnetic elements and further to diminish the output of the device at undesired low frequencies, spring members are utilized having a natural frequency of vibration above the frequency of the seismic waves of interest. The spring members comprise long, stiff extensions milled integrally from the magnetic elements and separated by spacer means to provide the desired air gap between the magnetic elements.

While the device described in the afore-referenced patent application has been found eminently satisfactory for the purpose for which it was intended, it does have certain disadvantages. Firstly; the spring extensions of the magnetic members are rather easily broken and, if they are broken, the entire transducer must be discarded. Secondly; for certain applications it is desirable to change the natural frequency of the transducer which is dependent upon the natural frequency of the spring members. The natural frequency of the milled flat springs integral with the magnetic elements cannot be readily changed.

Accordingly, one object of the present invention is to provide a variable-gap reluctance transducer, wherein component parts are utilized which are rugged in nature and not capable of being easily damaged.

Another object is to provide a variable-gap reluctance transducer, the natural frequency of which may be readily changed.

Still another object is to provide a variable reluctance transducer, wherein all of the component parts may be readily replaced in the event of damage or the necessity of changing certain designed criteria thereof.

One feature of the present invention lies in the use of spring means, each separately attachable to both of the magnetic elements of a variable-gap reluctance transducer to achieve the desired spacing therebetween. In a preferred embodiment of the invention, the springs are in the general shape of an inverted U, or the Greek letter $\Omega$. The natural frequency of the springs can be readily changed by substituting springs of various materials or thicknesses, and in the event of spring breakage, replacement springs can be readily affixed to the magnetic elements.

Other objects and features of the invention will become readily apparent upon consideration of the following description thereof, with reference to the accompanying drawings, wherein.

Figure 1:
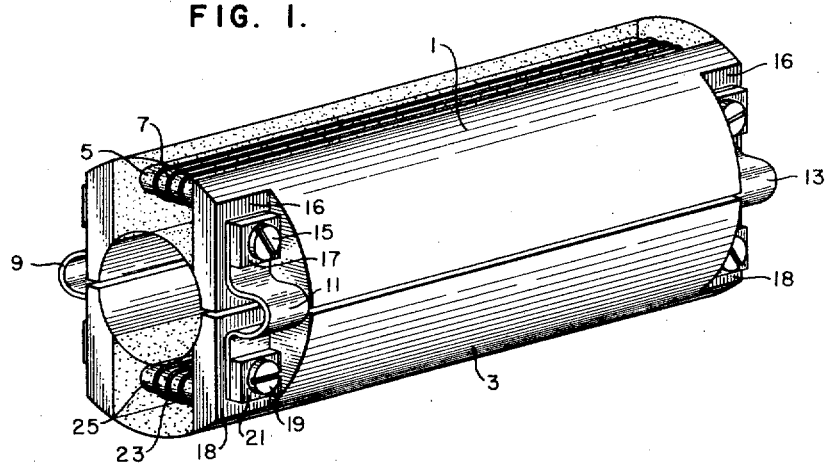
Fig. 1 is an isometric view of a preferred embodiment of the invention.

With reference now to the two figures of the drawing, there is shown a variable-gap reluctance transducer having two generally similar semi-cylindrical elements, 1 and 3 of semi-annular cross section. These elements are preferably of "soft" permanently magnetizable material having high reversible permeability, such as Permandur, in accordance with the teaching of the afore-referenced patent application. The relative reversible permeability of the magnetic material should be of a value greater than 30 for most effective operation of the transducer. Longitudinal grooves or channels are cut in the inner and outer surfaces of each of the magnetic elements so as to form a magnetic bridging section 5 in magnetic element 1, and a magnetic bridging section 25 in magnetic element 3. The function of these longitudinal grooves is to provide a pair of recesses for protecting pickup coil 7 wound on bridging element 5 and pickup coil 23 wound on bridging section 25. Only one pickup coil is absolutely necessary, but obviously a pair of pickup coils will provide twice the output voltage from the transducer. The pickup coils 7 and 23 may be secured in place by potting them, as shown, with a suitable potting material such as Scotchcast #3, manufactured by the Minnesota Mining and Manufacturing Company.

The magnetic elements 1 and 3 are each provided with four recesses, two at each end of each of the magnetic elements. The recesses provide flat surfaces, such as that designated by reference numerals 16 and 18, to provide a suitable surface for receiving spring members, three of which are designated by the reference numerals 9, 11 and 13. The function of the spring members is to space the magnetic elements to provide and air gap of the order of a few one-thousandths of an inch and to determine the natural frequency of the transducer. Preferably this air gap should be between .002 to .004 inch. A preferred form for the spring is that of a U, or the Greek letter $\Omega$, as mentioned above. As shown, the ends of the spring sections are secured to the flat sections, such as that designated by reference numeral 16, by nuts or screws 15 and 19, and lock washers or nuts 17 and 21. Typical materials of which the springs may be constructed are beryllium copper and non-magnetic spring steel. Suitable thicknesses for the springs have been found to be between 0.010" and 0.020."

Figure 2:
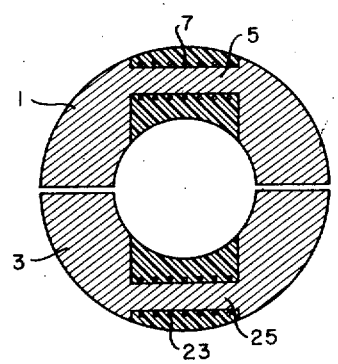
Fig. 2 is a cross-sectional view taken along a plane perpendicular to the longitudinal axis of the device shown in Fig. 1, mid-way between the ends thereof.

The operation of the device shown in Figs. 1 and 2 is the same as that described in the aforementioned patent application, Serial No. 444,171. The magnetic elements are permanently magnetized by injecting a pulse of current of high magnitude and short duration through the output coils or through a separate energizing coil on the magnetic elements. Elastic waves, such as seismic waves, impinging on the magnetic elements 1 and 3 will bring about variations in the magnetic flux transversing the magnetic circuit. Variations in the magnetic flux produced by the seismic waves will induce voltages in the output coils which are proportional to the magnitude of the waves impinging thereon.

The subject matter of the invention has been found to be very rugged and capable of taking considerable physical abuse. No particular difficulty has been found in connection with spring breakage, and adjustment of the frequency characteristics of the transducer may be readily effected by changing the springs, as mentioned above.

It will be understood that the embodiments of the invention herein shown and described are exemplary

I claim:

1. A generator device for producing electrical signals responsive to elastic waves impinging thereon comprising: a pair of generally semi-cylindrical members of semi-annular cross section of soft magnetic material having high reversible permeability; an output coil wound about at least one of said members; a plurality of substantially Ω shaped bowed spring means having a thickness of between .01 inch and between .02 inch, said spring means spacing said semi-cylindrical members to form a magnetic circuit with at least two air gaps, each air gap being not more than a few one-thousandths of an inch; each of said Ω shaped spring means being affixed to both of said magnetic members in recesses formed in the exterior of said magnetic members, the combination of said bowed spring means and said semi-cylindrical members having a predetermined natural frequency of vibration.

2. A generator device for producing electrical signals responsive to elastic waves impinging thereon, comprising: first and second generally semi-cylindrical members of semi-annular cross-section formed of soft magnetic material having high permeability; an output coil wound about at least one of said semi-cylindrical members; a pair of recesses formed in each end of said first and second semi-cylindrical members, each recess in said first semi-cylindrical member to form a composite recess; and a generally Ω shaped bowed spring means in each composite recess spacing apart said semi-cylindrical members to form a magnetic circuit having at least two air gaps of not more than a few one-thousandths of an inch; each of said bowed spring means being between .01 and .02 inch in thickness; the combination of said bowed spring means and said semi-cylindrical members having a predetermined natural frequency of vibration higher than the frequency of elastic waves to be detected thereby.

References Cited in the file of this patent

UNITED STATES PATENTS

| | | |
|---|---|---|
| 1,537,930 | Lichte | May 12, 1925 |
| 1,640,538 | Du Bois-Reymond | Aug. 30, 1927 |
| 1,735,532 | Dubilier | Nov. 12, 1929 |
| 2,311,079 | Parr | Feb. 16, 1943 |
| 2,396,394 | Shaw | Mar. 12, 1946 |

FOREIGN PATENTS

| | | |
|---|---|---|
| 140,367 | Australia | Mar. 2, 1951 |